US009296975B2

(12) United States Patent
Greaves et al.

(10) Patent No.: US 9,296,975 B2
(45) Date of Patent: Mar. 29, 2016

(54) ENERGY EFFICIENT POLYALKYLENE GLYCOLS AND LUBRICANT COMPOSITION CONTAINING SAME

(75) Inventors: Martin R. Greaves, Baar (CH); Ronald Van Voorst, Vogelwaarde (NL); Cynthia L. Rand, Sanford, MI (US); Marinus Meertens, Tereuzen (NL); Daniele Vinci, Gent (BE)

(73) Assignee: Dow Global Technologies LLC, Midland, MI (US)

( * ) Notice: Subject to any disclaimer, the term of this patent is extended or adjusted under 35 U.S.C. 154(b) by 230 days.

(21) Appl. No.: 14/118,712

(22) PCT Filed: Jun. 8, 2012

(86) PCT No.: PCT/US2012/041449
§ 371 (c)(1),
(2), (4) Date: Nov. 19, 2013

(87) PCT Pub. No.: WO2012/177415
PCT Pub. Date: Dec. 27, 2012

(65) Prior Publication Data
US 2015/0141308 A1    May 21, 2015

Related U.S. Application Data

(60) Provisional application No. 61/499,532, filed on Jun. 21, 2011.

(51) Int. Cl.
*C10M 107/34* (2006.01)
*C10M 169/04* (2006.01)
*C08G 65/28* (2006.01)
*C08G 65/26* (2006.01)

(52) U.S. Cl.
CPC ....... *C10M 169/042* (2013.01); *C08G 65/2606* (2013.01); *C10M 107/34* (2013.01); *C08G 2650/24* (2013.01); *C10M 2209/1033* (2013.01); *C10M 2209/1045* (2013.01); *C10N 2220/021* (2013.01); *C10N 2220/022* (2013.01); *C10N 2230/02* (2013.01); *C10N 2230/06* (2013.01); *C10N 2230/66* (2013.01)

(58) Field of Classification Search
CPC ........... C10M 169/042; C10M 107/34; C10M 2209/1033; C10M 2209/1045; C10N 2220/021; C10N 2220/022; C10N 2230/02; C10N 2230/06; C10N 2230/66; C08G 65/2606; C08G 2650/34
USPC .......................................... 508/579; 568/618
See application file for complete search history.

(56) References Cited

U.S. PATENT DOCUMENTS

| 4,299,993 | A | * | 11/1981 | Bethea | C08G 65/20 |
| | | | | | 528/408 |
| 4,481,123 | A | | 11/1984 | Hentschel et al. | |
| 5,648,557 | A | | 7/1997 | Wei | |
| 5,741,946 | A | * | 4/1998 | Wei | C08G 65/20 |
| | | | | | 568/613 |

FOREIGN PATENT DOCUMENTS

DE        10254795        6/2004

OTHER PUBLICATIONS

EP Response to Office Action dated May 27, 2015; from EP counterpart Application No. 12727747.3.
Response to Chinese Office Action dated Nov. 15, 2014 filed Mar. 30, 2015 for counterpart Chinese Application No. 201280030382.1, 3 pages.
English Abstract for DE 10254795 A1 filed Nov. 22, 2002, Applicant—Fuchs Europe Schmierstoffe GmbH, published Jun. 9, 2004.
PCT/US2012/041449 Search Report and Written Opinion dated Sep. 28, 2012.
PCT/US2012/041449 International Preliminary Report on Patentability dated Jan. 9, 2014.
Chinese First Office Action dated Nov. 15, 2014 for Chinese Application No. 201280030382.1, 4 pages.
EPO Communication Article 94(3) dated Feb. 6, 2015 for counterpart EPO Application No. 12727747.3, 5 pages.

* cited by examiner

*Primary Examiner* — James Goloboy

(57) ABSTRACT

A polyalkylene glycol comprising: a random copolymer comprising units derived from EO and units derived from PO initiated with polytetrahydrofuran; wherein the polyalkylene glycol has a pour point of less than or equal to −30° C. as measured using ASTM D97 and a traction value of less than 0.0165 at a contact pressure of 1.25 GPa, speed=2 m/s, SRR of 100% and temperature of 80° C. is provided. Also provided are lubricant compositions containing such polyalkylene glycol.

17 Claims, No Drawings

ENERGY EFFICIENT POLYALKYLENE GLYCOLS AND LUBRICANT COMPOSITION CONTAINING SAME

FIELD OF INVENTION

The instant invention relates to energy efficient polyalkylene glycols and to lubricant compositions comprising such energy efficient polyalkylene glycols as base oils.

BACKGROUND OF THE INVENTION

Polyalkylene glycols (PAG) comprised of random copolymers of ethylene oxide (EO) and propylene oxide (PO) are known to provide excellent friction control (i.e., low coefficients of friction) when used as base oils in lubricant formulations. The friction performance of such EO/PO PAGs is significantly superior to that of mineral oils, synthetic hydrocarbons and PAG polymers that are based on PO, butylene oxide (BO) or combinations thereof. High performance EO/PO random copolymer containing PAGs typically contain 50-60% by weight of units derived from EO. PAGs which are used in known lubricant formulations are PAGs produced using monol (e.g. butanol), diol (e.g. propylene glycol) or triol (e.g. glycerol) initiators.

EO/PO PAGs are typically used as the primary base oil in gear, calendar and bearing lubricants. For example, such PAGs are used at levels >50% by weight and more often at levels >95%.

A key trend in the industry is to develop more energy efficient lubricants by selecting base oils which can offer better friction control. Friction coefficients of EO/PO PAGs can be further lowered by increasing the EO-derived content of the polymers. However, increased levels of units derived from EO negatively impact the pour points of the EO/PO PAG. Thus, polymers with a content of units derived from EO of 75% have limited practical use as primary base oils in gear lubricants due their high pour points.

There remains a need for EO/PO PAGs with sufficiently high content of units derived from EO so as to provide lower coefficients of friction compared to conventional EO/PO PAGs while at the same time possessing acceptable low temperature properties, such as pour point. It would be further desirable that the EO/PO PAG remain clear, homogeneous and stable across a broad temperature range, such as from 50° C. to −25° C.

SUMMARY OF THE INVENTION

The instant invention is an energy efficient polyalkylene glycol and lubricant compositions comprising such polyalkylene glycol.

In one embodiment, the instant invention provides a polyalkylene glycol comprising: a random copolymer comprising units derived from EO and units derived from PO initiated with polytetrahydrofuran; wherein the polyalkylene glycol has a pour point of less than or equal to −30° C. as measured using ASTM D97 and a traction value of less than 0.015 at a contact pressure of 1.25 GPa, speed=2 m/s, slide roll ratio (SRR) of 100% and temperature of 80° C.

In another embodiment, the instant invention provides a polyalkylene glycol comprising:

a random copolymer comprising units derived from EO and units derived from PO initiated with polytetrahydrofuran in which the polytetrahydrofuran has an average molecular weight between 200 and 400 g/mole and having less than 10 weight percentage component having a molecular weight greater than 600 g/mole.

In an alternative embodiment, the instant invention further provides a lubricant composition comprising the polyalkylene glycol of the invention.

In an alternative embodiment, the instant invention provides a polyalkylene glycol and a lubricant composition comprising the polyalkylene glycol in accordance with any of the preceding embodiments, except that the polyalkylene glycol has a fraction value of less than 0.0135 at a contact pressure of 1.25 GPa, speed=2 m/s, SRR=50% and temperature of 80° C.

In an alternative embodiment, the instant invention provides a polyalkylene glycol and a lubricant composition comprising the polyalkylene glycol in accordance with any of the preceding embodiments, except that the pour point of the polyalkylene glycol is less than or equal to −35° C.

In an alternative embodiment, the instant invention provides a polyalkylene glycol and a lubricant composition comprising the polyalkylene glycol in accordance with any of the preceding embodiments, except that the polyalkylene glycol exhibits visual stability at 20° C.

In an alternative embodiment, the instant invention provides a polyalkylene glycol and a lubricant composition comprising the polyalkylene glycol in accordance with any of the preceding embodiments, except that the polyalkylene glycol exhibits visual stability at 4° C.

In an alternative embodiment, the instant invention provides a polyalkylene glycol and a lubricant composition comprising the polyalkylene glycol in accordance with any of the preceding embodiments, except that the polyalkylene glycol exhibits visual stability at 50° C.

In an alternative embodiment, the instant invention provides a polyalkylene glycol and a lubricant composition comprising the polyalkylene glycol in accordance with any of the preceding embodiments, except that the polyalkylene glycol exhibits visual stability at −25° C.

In an alternative embodiment, the instant invention provides a polyalkylene glycol and a lubricant composition comprising the polyalkylene glycol in accordance with any of the preceding embodiments, except that the random copolymer comprises from 55 to 70 percent by weight of units derived from EO and from 45 to 30 percent by weight of units derived from PO.

In an alternative embodiment, the instant invention provides a polyalkylene glycol and a lubricant composition comprising the polyalkylene glycol in accordance with any of the preceding embodiments, except that the random copolymer comprises from 60 to 65 percent by weight of units derived from EO and from 35 to 40 percent by weight of units derived from PO.

In an alternative embodiment, the instant invention provides a polyalkylene glycol and a lubricant composition comprising the polyalkylene glycol in accordance with any of the preceding embodiments, except that the polytetrahydrofuran has a weight average molecular weight between 150 and 350 g/mole.

In an alternative embodiment, the instant invention provides a polyalkylene glycol and a lubricant composition comprising the polyalkylene glycol in accordance with any of the preceding embodiments, except that the polytetrahydrofuran has a weight average molecular weight between 200 and 300 g/mole.

In an alternative embodiment, the instant invention provides a polyalkylene glycol and a lubricant composition comprising the polyalkylene glycol in accordance with any of the preceding embodiments, except that the random copolymer has a viscosity at 40° C. of from 61 to 75 cSt, or in the alternative, from 288 to 352 cSt, or in the alternative, from 900 to 1100 cSt.

In an alternative embodiment, the instant invention provides a polyalkylene glycol and a lubricant composition comprising the polyalkylene glycol in accordance with any of the preceding embodiments, except that the lubricant composition is an ISO-68, ISO-320 or ISO-1000 grade lubricant.

In an alternative embodiment, the instant invention provides a lubricant composition comprising the polyalkylene glycol in accordance with any of the preceding embodiments, except that the lubricant composition further comprises one or more additives selected from the group consisting of antioxidants, anti-wear additives and corrosion inhibitors.

In an alternative embodiment, the instant invention provides a lubricant composition, in accordance with any of the preceding embodiments, except that the lubricant composition further comprises one or more selected from the group of antioxidants, anti-wear additives and corrosion inhibitors.

In an alternative embodiment, the instant invention provides a lubricant composition, in accordance with any of the preceding embodiments, except that the antioxidants are selected from the group consisting of phenolic antioxidants, hindered phenolic antioxidants, aromatic amine antioxidants, secondary amine antioxidants, sulfurized phenolic antioxidants, sulfurized olefins, oil-soluble copper compounds, and combinations thereof.

In an alternative embodiment, the instant invention provides a lubricant composition, in accordance with any of the preceding embodiments, except that the corrosion inhibitors are selected from the group consisting of (1) amine salts of an aliphatic phosphoric acid ester; (2) alkenyl succinic acid half esters in mineral oil; (3) amine salts of an alkyl phosphoric acid combined with a dithiophosphoric acid derivative; (4) combinations of barium dinonylnaphthalene sulfonate and dinonylnaphthalene carboxylate in a hydrotreated naphthenic oil; and (5) combinations thereof.

In an alternative embodiment, the instant invention provides a lubricant composition, in accordance with any of the preceding embodiments, except that the anti-wear additives are selected from the group consisting of zinc dialkyldithiophosphates, tricresyl phosphate, didodecyl phosphite, sulfurized sperm oil, sulfurized terpenes, zinc dialkyldithiocarbamate, and combinations thereof.

DETAILED DESCRIPTION OF THE INVENTION

The instant invention is an energy efficient polyalkylene glycol and a lubricant composition comprising such polyalkylene glycol.

The polyalkylene glycol according to the present invention comprises: a random copolymer comprising units derived from EO and units derived from PO initiated with polytetrahydrofuran; wherein the polyalkylene glycol has a pour point of less than or equal to −30° C. as measured using ASTM D97 and a traction value of less than 0.015 at a contact pressure of 1.25 GPa, speed=2 m/s, SRR of 100% and temperature of 80° C.

The inventive polyalkylene glycol exhibits a pour point of less than or equal to −30° C. as measured using ASTM D97. All individual values and subranges from less than or equal to −30° C. are included herein and disclosed herein; for example, the pour point can be from an upper limit of −30, −32, −33, −34, −35, −36, −37, −38 or −40° C.

The inventive polyalkylene glycol exhibits a fraction value of less than 0.015 at a contact pressure of 1.25 GPa, speed=2 m/s, SRR of 100% and temperature of 80° C. All individual values and subranges from less than 0.015 are included herein and disclosed herein; for example, the fraction value can be less than 0.015, or in the alternative, the traction value can be less than 0.013, or in the alternative, the fraction value can be less than 0.011, or in the alternative, the traction value can be less than 0.009, or in the alternative, the traction value can be less than 0.007.

In one specific embodiments, the inventive polyalkylene glycol has a traction value of less than 0.0135 at a contact pressure of 1.25 GPa, speed=2 m/s, SRR=50% and temperature of 80° C.

In some embodiments, the inventive polyalkylene glycol exhibits visual stability at least at temperatures from 50° C. to −25° C. All individual values and subranges from 50° C. to −25° C. are included herein and disclosed herein; for example, the polyalkylene glycol exhibits visual stability at temperatures from a lower limit of −25, −15, −5, 0, 5, 15, 20, 25, 30, 35, 40, or 45° C. to an upper limit of −15, −5, 0, 5, 15, 20, 25, 30, 35, 40, 45, or 50° C. For example, the polyalkylene glycol exhibits visual stability at 4° C., or in the alternative, the polyalkylene glycol exhibits visual stability at 20° C., or in the alternative, the polyalkylene glycol exhibits visual stability at 50° C., or in the alternative, the polyalkylene glycol exhibits visual stability at −25° C.

In some embodiments of the inventive polyalkylene glycol, the random copolymer comprises from 55 to 70 percent by weight of units derived from EO and from 45 to 30 percent by weight of units derived from PO. All individual values and subranges from 55 to 70 percent by weight of units derived from EO are included herein and disclosed herein; for example, the amount of units derived from EO in the random copolymer can be from a lower limit of 55, 57, 59, 61, 63, 65, 67 or 69 weight percent to an upper limit of 57, 59, 61, 63, 65, 67, 69 or 70 weight percent. For example, the amount of units derived from EO in the random copolymer may be in the range of from 55 to 70 weight percent, or in the alternative, the amount of units derived from EO in the random copolymer may be in the range of from 60 to 68 weight percent, or in the alternative, the amount of units derived from EO in the random copolymer may be in the range of from 56 to 66 weight percent, or in the alternative, the amount of units derived from EO in the random copolymer may be in the range of from 65 to 70 weight percent. Likewise, all individual values and subranges from 30 to 45 percent by weight of units derived from PO are included herein and disclosed herein; for example, the amount of units derived from PO in the random copolymer can be from a lower limit of 30, 33, 36, 39, or 44 weight percent to an upper limit of 32, 35, 38, 41, 44, or 45 weight percent. For example, the amount of units derived from PO in the random copolymer may be in the range of from 45 to 30 weight percent, or in the alternative, the amount of units derived from PO in the random copolymer may be in the range of from 40 to 36 weight percent, or in the alternative, the amount of units derived from PO in the random copolymer may be in the range of from 45 to 34 weight percent, or in the alternative, the amount of units derived from PO in the random copolymer may be in the range of from 35 to 30 weight percent.

In one particular embodiment of the inventive polyalkylene glycol, the random copolymer comprises from 60 to 65 percent by weight of units derived from EO and from 35 to 40 percent by weight of units derived from PO.

In some embodiments of the inventive polyalkylene glycol, the polytetrahydrofuran has a weight average molecular weight between 150 and 350 g/mole. All individual values and subranges from 150 to 350 g/mole are included herein and disclosed herein; for example, the molecular weight of the polytetrahydrofuran can be from a lower limit of 150, 175, 200, 225, 250, 275, 300 or 325 g/mole to an upper limit of 175, 200, 225, 250, 275, 300, 325, or 350 g/mole. For example, the molecular weight of the polytetrahydrofuran may be in the range of from 150 to 350 g/mole, or in the alternative, the molecular weight of the polytetrahydrofuran may be in the range of from 200 to 300 g/mole, or in the alternative, the molecular weight of the polytetrahydrofuran may be in the range of from 175 to 250 g/mole, or in the alternative, the molecular weight of the polytetrahydrofuran may be in the range of from 225 to 325 g/mole, or in the alternative, the molecular weight of the polytetrahydrofuran may be in the range of from 250 to 350 g/mole.

In some embodiments of the polyalkylene glycol, the random copolymer has a molecular weight from 700 to 5000 g/mole. All individual values and subranges from 700 to 5000 g/mole are included herein and disclosed herein; for example, the random copolymer molecular weight can be from a lower limit of 700, 900, 1300, 1700, 2400, 2700, 3300, 3900, 4500 or 4700 g/mole to an upper limit of 800, 1500, 2600, 3000, 3500, 4600, or 5000 g/mole. For example, the random copolymer molecular weight may be in the range of from 700 to 5000 g/mole, or in the alternative, the random copolymer molecular weight may be in the range of from 1500 to 4500 g/mole, or in the alternative, the random copolymer molecular weight may be in the range of from 2000 to 4000 g/mole, or in the alternative, the random copolymer molecular weight may be in the range of from 900 to 3500 g/mole.

In an alternative embodiment, the instant invention provides a polyalkylene glycol comprising: a random copolymer comprising units derived from EO and units derived from PO initiated with polytetrahydrofuran having an average molecular weight between 200 and 400 g/mole and having less than 10 weight percentage component having a molecular weight greater than 600 g/mole. All individual values and subranges from less than 10 weight percentage component having a molecular weight greater than 600 g/mole are included herein and disclosed herein. For example, the polyalkylene glycol may have a high molecular weight component from an upper limit of 10, 9, 8, 7, 6, 5, 4, 3, 2 or 1 weight percent.

In an alternative embodiment, the instant invention further provides a lubricant composition comprising the polyalkylene glycol of any one of the preceding embodiments.

In some embodiments, the inventive lubricant composition further comprises one or more additives selected from the group consisting of antioxidants, anti-wear additives and corrosion inhibitors.

Additives may be used for a variety of purpose in lubricants. Certain embodiments of the inventive lubricant composition may include one or more additives selected from the group of antioxidants, anti-wear additives and corrosion inhibitors. Exemplary antioxidants useful in various embodiments of the inventive lubricant composition include phenolic antioxidants, hindered phenolic antioxidants, aromatic amine antioxidants, secondary amine antioxidants, sulfurized phenolic antioxidants, sulfurized olefins, oil-soluble copper compounds, and combinations thereof. Exemplary corrosion inhibitors useful in various embodiments of the inventive lubricant composition include: (1) an amine salt of an aliphatic phosphoric acid ester (for example, NALUBE 6110, available from King Industries); (2) an alkenyl succinic acid half ester in mineral oil (for example, IRGACOR L12, available from BASF Corporation); (3) an amine salt of an alkyl phosphoric acid combined with a dithiophosphoric acid derivative (for example, NALUBE 6330, available from King Industries); (4) a combination of barium dinonylnaphthalene sulfonate and dinonyl naphthalene carboxylate in a hydrotreated naphthenic oil (for example, NASUL BSN, available from King Industries); and (5) combinations thereof. Exemplary anti-wear additives useful in various embodiments of the inventive lubricant composition include zinc dialkyldithiophosphates, tricresyl phosphate, didodecyl phosphite, sulfurized sperm oil, sulfurized terpenes, zinc dialkyldithiocarbamate, and combinations thereof. Typical additive packages include antioxidants and corrosion inhibitors such as a combination of (4-nonlyphenol)acetic acid, a proprietary acylsarkosinate and nonyl phenol (IRGACOR L17), N-phenyl-ar-(1,1,3,3-tetramethylbutyl)-1-naphthaleneamine (IRGANOX L06), a reaction product of N-phenyl-benzenamine with 2,4,4-trimethylpentent diphenylamine (IRGANOX L57), tolyltriazole and monomethyl hydroquinone. IRGANOX and IRGACOR may be obtained from the BASF Corporation. Yet other additives which may be used in lubricants include defoamers such as polymethylsiloxanes, demulsifiers, copper corrosion inhibitors, rust inhibitors, pour point depressants, detergents, dyes, metal deactivators, supplemental friction modifiers, diluents, combinations thereof, and the like. Additives may be used in any convenient combination or amount but typically comprise from 0.05 wt % to 5 wt %, preferably from 1 wt % to 3 wt %, of the total composition.

EXAMPLES

The following examples illustrate the present invention but are not intended to limit the scope of the invention. The examples of the instant invention demonstrate that specific polyalkylene glycol compositions and structures in accordance with the present invention provide both good low temperature properties and low coefficients of friction.

All inventive polyalkylene glycols examples were prepared using the following general alkoxylation procedure.

The initiator polyTHF250 (which is a polytetrahydrofuran having a weight average molecular weight of 250 g/mole available from BASF) is loaded into a glass or stainless steel reactor, equipped with a stirrer, an alkylene oxide dosing system and a vacuum system. 45% aqueous KOH is added to an end batch concentration of 2000 ppm. This mixture is heated to 115° C. and the water present is removed by means of vacuum (30 mbar, 1.5 hr) to a level of less than 2000 ppm water. The reactor is then heated to the desired alkoxylation temperature (135° C.) and the alkylene oxide mixture (EO/PO) is added over time. Once all oxide has been added and has reacted, the reactor is cooled down to 80° C. At this temperature, the product is treated with a filter agent and the catalyst is removed by filtration.

Table 1 provides compositional information on the Inventive Examples and Comparative Examples.

TABLE 1

| Example | Initiator Type | Initiator | Units derived from EO, wt % | Units derived from PO, wt % | Units derived from BO, wt % |
|---|---|---|---|---|---|
| Comp. Ex. 1 | Monol | DPnB | 60 | 40 | 0 |
| Comp. Ex. 2 | Monol | DPnB | 75 | 25 | 0 |
| Comp. Ex. 3 | Diol | P-200 | 60 | 40 | 0 |
| Comp. Ex. 4 | Diol | P-200 | 75 | 25 | 0 |
| Comp. Ex. 5 | Diol | 1,4-butanediol | 62 | 38 | 0 |
| Comp. Ex. 6 | Diol | EB-500 | 70 | 30 | 0 |
| Comp. Ex. 7 | Diol | EB-500 | 75 | 25 | 0 |
| Comp. Ex. 8 | Diol | P-400 | 0 | 50 | 50 |
| Comp. Ex. 9 | Diol | B-250 | 0 | 0 | 100 |
| Comp. Ex. 10 | Triol | Glycerol | 50 | 50 | 0 |

TABLE 1-continued

| Example | Initiator Type | Initiator | Units derived from EO, wt % | Units derived from PO, wt % | Units derived from BO, wt % |
|---|---|---|---|---|---|
| Comp. Ex. 11 | Triol | Glycerol | 60 | 40 | 0 |
| Comp. Ex. 12 | Triol | Glycerol | 75 | 25 | 0 |
| Comp. Ex. 13 | Diol | polyTHF250-HMW tail | 60 | 40 | 0 |
| Comp. Ex. 14 | Diol | polyTHF250-HMW tail | 62 | 38 | 0 |
| Comp. Ex. 15 | Diol | polyTHF250-HMW tail | 64 | 36 | 0 |
| Comp. Ex. 16 | Diol | polyTHF250-HMW tail | 65 | 35 | 0 |
| Comp. Ex. 17 | Diol | polyTHF250-HMW tail | 75 | 25 | 0 |
| Comp. Ex. 18 | Diol | polyTHF-650 | 50 | 50 | 0 |
| Inv. Ex. 1 | Diol | polyTHF-250 | 62 | 38 | 0 |
| Inv. Ex. 2 | Diol | polyTHF-250 | 65 | 35 | 0 |

Table 1 Legend polyTHF-250 is polytetrahydrofuran having a weight average molecular weight of 250 g/mole, available from BASF.

polyTHF-650 is a polytetrahydrofuran having a weight average molecular weight of 650 g/mole available from INVISTA (a wholly-owned subsidiary of Koch Industries, Inc.).

polyTHF-250-HMW tail is a polytetrahydrofuran having a weight average molecular weight of 250 g/mole and having 10 weight % of high molecular weight material, n.b. having a molecular weight equal to or greater than 630 g/mole, available from INVISTA (a wholly-owned subsidiary of Koch Industries, Inc.).

P-200 is polypropylene glycol having a weight average molecular weight of 200 g/mole, prepared by propoxylation of monopropylene glycol.

P-400 is polypropylene glycol having a weight average molecular weight of 400 g/mole, available from Dow Chemical under the trade name SYNALOX 100-D20.

EB-500 is ethylene oxide/butylene oxide random copolymer having a weight average molecular weight of 500 g/mole, prepared by reacting monopropylene glycol with a 75/25 (by weight) EO/BO random feed.

DPnB is DOWANOL DPnB, a Dipropylene Glycol n-Butyl Ether, available from the Dow Chemical Company.

B-250 is polybutylene glycol having a weight average molecular weight of 250 g/mole, prepared by butoxylation of monopropylene glycol.

Table 2 provides the viscosity at 40° C., viscosity index, pour point, friction at 50% SSR and friction at 100% SSR, each measured as described below, for each of the Comparative Examples 1-18 and Inventive Examples 1-2.

TABLE 2

| Example | Viscosity at 40° C., cSt | Viscosity Index | Pour point, ° C. | Friction at 50% SSR | Friction at 100% SSR |
|---|---|---|---|---|---|
| Comp. Ex. 1 | 291 | 228 | −41 | 0.0139 | 0.0171 |
| Comp. Ex. 2 | 318 | 251 | −3 | 0.0109 | 0.0132 |
| Comp. Ex. 3 | 322 | 250 | −33 | 0.0134 | 0.0154 |
| Comp. Ex. 4 | 358 | 245 | 2 | 0.0113 | 0.0136 |
| Comp. Ex. 5 | 306 | 242 | −35 | 0.013 | 0.0153 |
| Comp. Ex. 6 | 262 | 227 | −16 | 0.0122 | 0.015 |
| Comp. Ex. 7 | 333 | 235 | −1 | 0.0125 | 0.015 |
| Comp. Ex. 8 | 321 | 197 | −37 | 0.0433 | 0.037 |
| Comp. Ex. 9 | 315 | 164 | −38 | 0.0445 | 0.0388 |
| Comp. Ex. 10 | 326 | 235 | −39 | 0.0184 | 0.0204 |
| Comp. Ex. 11 | 334 | 238 | −41 | 0.0148 | 0.0168 |
| Comp. Ex. 12 | 326 | 238 | −2 | 0.0126 | 0.0149 |
| Comp. Ex. 13 | 330 | 243 | −43 | — | — |
| Comp. Ex. 14 | 317 | 240 | −41 | 0.0133 | 0.0164 |
| Comp. Ex. 15 | 323 | 242 | −35 | 0.0119 | 0.0143 |
| Comp. Ex. 16 | 326 | 242 | −32 | 0.0119 | 0.0144 |
| Comp. Ex. 17 | 330 | 241 | −1 | 0.0104 | 0.0131 |
| Comp. Ex. 18 | 314 | 241 | −19 | — | — |
| Inv. Ex. 1 | 298 | 240 | −41 | 0.0131 | 0.0162 |
| Inv. Ex. 2 | 314 | 241 | −35 | 0.0117 | 0.0141 |

Table 3 provides the blend stability data, measured as described below under Test Methods, for each of the Inventive Examples 1-2 and Comparative Examples 1-18.

TABLE 3

| Example | Stability at 20° C. | Stability at 4° C. | Stability at 50° C. | Stability at −25° C. |
|---|---|---|---|---|
| Comp. Ex. 1 | Clear | Clear | Clear | Hazy |
| Comp. Ex. 2 | Clear | Clear | Clear | Hazy |
| Comp. Ex. 3 | Clear | Clear | Clear | Hazy |
| Comp. Ex. 4 | Hazy | Clear | Clear | Hazy |
| Comp. Ex. 5 | Clear | Clear | Clear | Hazy |
| Comp. Ex. 6 | Clear | Clear | Clear | Hazy |
| Comp. Ex. 7 | Hazy | Clear | Clear | Hazy |
| Comp. Ex. 8 | Clear | Clear | Clear | Clear |
| Comp. Ex. 9 | Clear | Clear | Clear | Clear |
| Comp. Ex. 10 | Clear | Clear | Clear | Clear |
| Comp. Ex. 11 | Clear | Clear | Clear | Hazy |
| Comp. Ex. 12 | Hazy | Clear | Clear | Hazy |
| Comp. Ex. 13 | Hazy | Clear | Clear | Hazy |
| Comp. Ex. 14 | Hazy | Hazy | Clear | Hazy |
| Comp. Ex. 15 | Hazy | Hazy | Clear | Hazy |
| Comp. Ex. 16 | Hazy | Hazy | Clear | Hazy |
| Comp. Ex. 17 | Hazy | Hazy | Clear | Hazy |
| Comp. Ex. 18 | Hazy | Hazy | Clear | Hazy |
| Inv. Ex. 1 | Clear | Clear | Clear | Clear |
| Inv. Ex. 2 | Clear | Clear | Clear | Clear |

The data contained in Table 1-3 clearly illustrate that those polyalkylene glycols produced from a polyalkylene which is a random copolymer having units derived from EO and PO and initiated with polytetrahydrofuran, in accordance with the present invention, exhibit blend stability, good friction characteristics while maintaining good low temperature processability (i.e., pour point). Polyalkylene glycols containing higher levels of units derived from EO, such as Comparative Examples 2, 4, 6, 7 and 12 exhibit acceptable friction characteristics but have higher pour points than desired. Comparative Examples 8 and 9 which contain a 50 wt %/50 wt % PO/BO copolymer and a 100 wt % BO copolymer exhibit acceptably low pour points but also exhibit unacceptably high friction. Similarly, triol initiated EO/PO based polyalkylene glycols of Comparative Examples 10-11 exhibit good pour points but higher friction. Comparative Examples 1 and 3, monol and diol initiated EO/PO based polyalkylene glycols, respectively also exhibit acceptable pour points but unacceptably high friction.

As can be further seen, the use of polytetrahydrofuran having no high molecular weight tail (i.e. less than 10 weight percent component with molecular weight over 600 g/mole) provides a polyalkylene glycol having the low temperature processability, visual stability and low friction of the inventive polyalkylene glycols. Those polyalkylene glycols initiated with polytetrahydrofuran having such high molecular weight tails do not provide the desired combination of these properties.

Test Methods

Test methods include the following:

Traction Measurement Method

Traction curves were measured under sliding/rolling conditions using a Mini-Traction Machine (from PCS Instruments) in which a steel ball (¾ inch diameter) is rotated on a steel disc. Traction coefficients were measured at 80° C. at slide-roll ratios (SRR) from 0 to 100% and a speed 2 m/s and at a contact pressure of 1.25 GPa (70N load). Traction data was reported at 50% and 100% SRR.

The slide roll ratio, SRR, is the ratio of sliding speed to entrainment speed, i.e.

$$SRR = [U2 - U1]/U$$

where entrainment speed (U) is defined as the mean speed of the two surfaces as follows $$U = \frac{1}{2}(U1 + U2)$$

where U1 and U2 are the ball and disc speeds, respectively.

Blend Stability Testing

Blend stability of the polymers was assessed at ambient (20° C.), 50° C., 4° C. and −25° C. by storing 200 mls of fluid in an oven, refrigerator or freezer for 24 hours and visually noting the appearance of the polymers. Their appearance was noted as clear or hazy.

Molecular Weight

All molecular weights herein are weight average molecular weights.

The Molecular Weight Distribution was determined by means of room temperature GPC with RI detector. The estimated applicable range of the used procedure is between 100 to 10000 Daltons.

Sample preparation for molecular weight determination:

120±20 mg of sample was weighed into a 20 mL vial and 10 mL Tetrahydrofuran (HPLC grade) was added. The vials were sealed with butyl rubber septum and the vials were shaken.

| GPC Instrument conditions | | | |
|---|---|---|---|
| GPC system | | Settings | |
| Degasser | Agilent G1379A; 2 channels in series | | |
| Pump | Agilent 1100 G1310A; isocratic | Flow (ml/min) | 1 |
| Autosampler | Agilent 1100 G1313A | Injection volume (μl) | 50 |
| Column oven | Shimadzu column box CTO-10A VP | Oven temperature (° C.) | 35 |
| Column | Series of 4 PL-Gel (7 mm × 30 cm) columns, each filled with PS/DVB of 50, 100, 500 or 1000 Å | | |
| RI Detector | Agilent 1100 Differential Refractive Index Detector | Peak width (min) | >0.2 |
| | | RI temperature (° C.) | 35 |
| UV/Vis Detector | Agilent 1100 G1315B | Wavelength (nm) | 240 |

Calibration for GPC Analysis:

The GPC analysis was calibrated using a polyol mixture (1.5 wt-% in THF) of CP6001, CP4100, P2000, and CP1000. The calculation was based on a broad standard method. The calibration parameters of this standard mixture are: Mw=2572 and Mn=1732 g/mol.

The present invention may be embodied in other forms without departing from the spirit and the essential attributes thereof, and, accordingly, reference should be made to the appended claims, rather than to the foregoing specification, as indicating the scope of the invention.

We claim:

1. A polyalkylene glycol comprising:
   a random copolymer comprising units derived from EO and units derived from PO initiated with polytetrahydrofuran;
   wherein the polyalkylene glycol has a pour point of less than or equal to −30° C. as measured using ASTM D97 and a traction value of less than 0.0165 at a contact pressure of 1.25 GPa, speed=2 m/s, SRR of 100% and temperature of 80° C.

2. The polyalkylene glycol according to claim 1 wherein the polyalkylene glycol has a traction value of less than 0.0135 at a contact pressure of 1.25 GPa, speed=2 m/s, SRR=50% and temperature of 80° C.

3. The polyalkylene glycol according to claim 1 wherein the pour point is less than or equal to −35° C.

4. The polyalkylene glycol according to claim 1 wherein the polyalkylene glycol exhibits visual stability at 20° C.

5. The polyalkylene glycol according to claim 1 wherein the polyalkylene glycol exhibits visual stability at 4° C.

6. The polyalkylene glycol according to claim 1 wherein the polyalkylene glycol exhibits visual stability at 50° C.

7. The polyalkylene glycol according to claim 1 wherein the polyalkylene glycol exhibits visual stability at −25° C.

8. The polyalkylene glycol according to claim 1 wherein the random copolymer comprises from 55 to 70 percent by weight of units derived from EO and from 45 to 30 percent by weight of units derived from PO.

9. The polyalkylene glycol according to claim 1 wherein the random copolymer comprises from 60 to 65 percent by weight of units derived from EO and from 35 to 40 percent by weight of units derived from PO.

10. The polyalkylene glycol according to claim 1 wherein the polytetrahydrofuran has a weight average molecular weight between 150 and 350 g/mole.

11. The polyalkylene glycol according to claim 1 wherein the polytetrahydrofuran has a weight average molecular weight between 200 and 300 g/mole.

12. A polyalkylene glycol comprising:
   a random copolymer comprising units derived from EO and units derived from PO initiated with polytetrahydrofuran in which the polytetrahydrofuran has a weight average molecular weight between 200 and 400 g/mole and having less than 10 weight percentage component having a molecular weight greater than 600 g/mole.

13. The polyalkylene glycol according to claim 12 having a pour point of less than or equal to −30° C. as measured using ASTM D97.

14. The polyalkylene glycol according to claim 12 having a traction value of less than 0.0165 at a contact pressure of 1.25 GPa, speed=2 m/s, SRR of 100% and temperature of 80° C.

15. The polyalkylene glycol according to claim 12 exhibiting visual stability at temperatures from −25 to 50° C.

16. A lubricant composition comprising the polyalkylene glycol according to claim 1.

17. The lubricant composition according to claim 12 further comprising one or more additives selected from the group consisting of antioxidants, anti-wear additives and corrosion inhibitors.

* * * * *